United States Patent
Dido et al.

(10) Patent No.: US 7,426,862 B2
(45) Date of Patent: Sep. 23, 2008

(54) THERMAL ACCELEROMETER WITH AUTOMATIC ZERO CONTROL

(75) Inventors: Jérôme Dido, Paris (FR); Pierre Loisel, Courdimanche (FR); Alain Renault, Pontoise (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 11/431,545

(22) Filed: May 11, 2006

(65) Prior Publication Data

US 2006/0254353 A1     Nov. 16, 2006

(30) Foreign Application Priority Data

May 13, 2005   (FR)   .................................. 05 04868

(51) Int. Cl.
*G01P 15/00* (2006.01)
(52) U.S. Cl. .................. 73/514.09; 73/514.05
(58) Field of Classification Search ............ 73/497, 73/514.03, 514.09, 514.16, 514.29, 514.33, 73/514.05
See application file for complete search history.

(56) References Cited

U.S. PATENT DOCUMENTS

| | | | | |
|---|---|---|---|---|
| 4,088,027 A | * | 5/1978 | Hernandez et al. | 73/514.21 |
| 4,232,553 A | * | 11/1980 | Benedetto et al. | 73/514.03 |
| 5,808,197 A | * | 9/1998 | Dao | 73/514.09 |
| 5,945,601 A | * | 8/1999 | Hosoi et al. | 73/514.33 |
| 6,795,752 B1 | * | 9/2004 | Zhao et al. | 700/299 |
| 7,096,734 B2 | * | 8/2006 | Boyer et al. | 73/514.16 |

FOREIGN PATENT DOCUMENTS

| | | |
|---|---|---|
| DE | 103 48 245 A1 | 12/2004 |
| FR | 2 817 351 A1 | 5/2002 |

* cited by examiner

*Primary Examiner*—Helen C. Kwok
(74) *Attorney, Agent, or Firm*—Muncy, Geissler, Olds & Lowe, PLLC

(57) ABSTRACT

A thermal accelerometer comprising two detector strands having resistivity that is temperature sensitive, a detector member for detecting a temperature difference between the detector strands, a feedback member for establishing temperature equilibrium between the detector strands by supplying the detector strands with pulse feedback signals of variable width, a member for calculating acceleration, and a multiplexer member connected to the detector strands, to the detector member, and to the feedback member so as to perform the following in alternation: measuring the temperature difference between the detector strands; and providing the detector strands with the feedback signals, the widths of the pulse signals being determined by comparing a sawtooth signal with DC signals representative of the temperature difference between the detector strands.

4 Claims, 1 Drawing Sheet

Feedback B1

Feedback B2

THERMAL ACCELEROMETER WITH AUTOMATIC ZERO CONTROL

The present invention relates to a thermal accelermeter with automatic zero control.

BACKGROUND OF THE INVENTION

Document FR-A-2 817 351 discloses a thermal accelerometer comprising a gas-filled enclosure containing a middle heater strand with detector strands extending on either side thereof, the resistivity of the detector strands being temperature sensitive. The detector strands are connected in a Wheatstone bridge together with constant resistances. The Wheatstone bridge is connected to a measurement circuit that delivers an electrical signal representative of a temperature difference between the detector strands. The temperature difference leads to an unbalance of the Wheatstone bridge and is representative of the acceleration to which the accelerometer is being subjected.

In order to increase the accuracy and the ability of the accelerometer to detect variations in acceleration at high frequencies, that document also proposes associating feedback strands with the detector strands, the feedback strands being disposed on either side of the detector strands and being fed with a feedback signal for compensating the temperature difference between the detector strands and for enabling the unbalance of the detector strands to be subjected to automatic zero control.

In a particular embodiment, it is stated that the feedback signals are applied to the feedback strands. Provision is also made for the feedback signals to be pulse signals that could be of variable width, but that in the embodiment described more particularly are pulse signals of constant width, thereby implying complex management of the feedback signals.

OBJECT OF THE INVENTION

An object of the invention is to propose an accelerometer presenting performance that is at least as good as that of an accelerometer with automatic zero control, while simultaneously simplifying its servo-control.

BRIEF SUMMARY OF THE INVENTION

The invention provides a thermal accelerometer comprising two detector strands having resistivity that is temperature sensitive, a detector member for detecting a temperature difference between the detector strands, a feedback member for establishing temperature equilibrium between the detector strands by supplying the detector strands with pulse feedback signals of variable width, a member for calculating acceleration, and a multiplexer member connected to the detector strands, to the detector member, and to the feedback member so as to perform the following in alternation: measuring the temperature difference between the detector strands; and providing the detector strands with the feedback signals, the widths of the pulse signals being determined by comparing a sawtooth signal with DC signals representative of the temperature difference between the detector strands.

Thus, temperature compensation is performed automatically as a function of temperature difference, such that the implementation of the compensation function is considerably simplified.

In an advantageous version of the invention, the DC signals representative of the temperature difference between the detector strands are symmetrical about a mean value of the sawtooth signal.

Thus, the feedback signals have a mean value of zero so that the accelerometer remains insensitive to an environment that is disturbed from an electromagnetic point of view.

BRIEF DESCRIPTION OF THE DRAWING

Other characteristics and advantages of the invention appear on reading the following description of a particular, non-limiting embodiment of the invention, given with reference to the accompanying figures, in which.

DETAILED DESCRIPTION OF THE INVENTION

Figure 1:
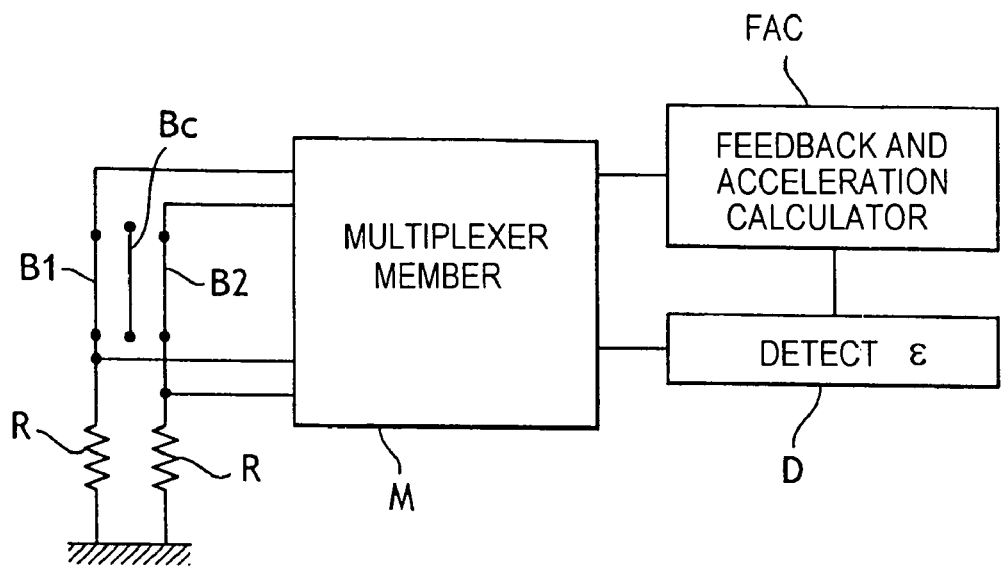
FIG. 1 is a block and circuit diagram of the accelerometer of the invention.

With reference to FIG. 1, the accelerometer of the invention comprises in conventional manner a heater strand Bc and detector strands B1 and B2 disposed on either side of the heater strand Bc and parallel therewith. Also in conventional manner, the accelerometer has resistors R connected so as to constitute a Wheatstone bridge together with the detector strands B1 and B2.

In the invention, the accelerometer further comprises a multiplexer member M connected firstly to a detector member D for detecting a temperature difference $\epsilon$ between the detector strands B1, B2, and secondly connected to a feedback and acceleration calculator member FAC also connected to the detector member D.

In a step of detecting acceleration, the multiplexer member connects the detector strands B1 and B2 and the resistors R in a Wheatstone bridge having its diagonal connected to the detector member D to measure the unbalance of the Wheatstone bridge so as to deduce therefrom the temperature difference $\epsilon$ between the detector strands B1 and B2. This temperature difference $\epsilon$ is transmitted to the feedback member in order to generate feedback signals.

Figure 2:
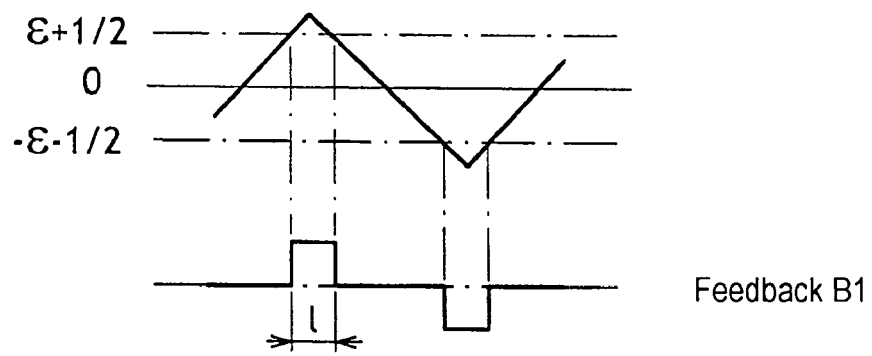
FIG. 2 is a diagram showing one way of obtaining feedback signals by comparison with a sawtooth signal.
Figure 2:
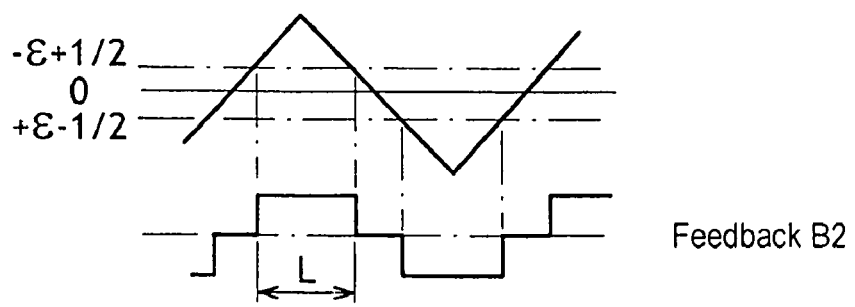

In the embodiment shown in FIG. 2, a pulse feedback signal is generated for each of the detector strands B1 and B2. For the detector strand B1, the feedback signal is obtained by comparing a sawtooth signal, in this case a signal that varies between −1 and +1 with direct current (DC) signals that are symmetrical about a mean value of the sawtooth signal and that are representative of the temperature difference between the detector strands, in this case signals $\epsilon+½$ and $-\epsilon-½$. The pulses of the corresponding feedback signal are determined by a change of state on each occasion the sawtooth signal becomes equal to one of the DC signals representative of the temperature difference between the detector strands. In this method of generating the feedback signal, the value representative of the temperature difference is naturally normalized so as to lie in the range 0 and ½. The resulting pulses are of width l.

Furthermore, in order to obtain the feedback signal for the strand B2, the same sawtooth signal is compared with DC signals that are likewise symmetrical about the mean value of the sawtooth signal, and in this case $-\epsilon+½$ and $+\epsilon-½$. The pulses obtained are of width L that is different from the width l whenever $\epsilon$ is not zero.

It should be observed that when the temperature difference has a value of zero, then the two feedback signals have pulses of equal widths, whereas when the temperature difference has a value that is not zero, the feedback signals have pulses of different widths, thus enabling the temperatures of the detector strands to be brought back into equilibrium. This method of obtaining feedback signals makes it possible to provide a thermal accelerometer of the invention without a heater strand Bc, the heater strand being replaced by the heating due to the balanced feedback signals.

Naturally, the invention is not limited to the embodiment described and variants can be applied thereto without going beyond the ambit of the invention as defined by the claims.

In particular, implementing feedback signals having a mean value of zero is essentially for the purpose of avoiding the detector strands becoming deformed when they are subjected to electromagnetic disturbances. When the accelerometer is not subjected to electromagnetic disturbances, for example when the accelerometer is protected by shielding, it is possible to make use of feedback signals having a mean value that is not zero. Under such circumstances, it is even possible to generate a single pulse signal for both detector strands. The single pulse signal is then generated by comparing the sawtooth signal with DC signals that are not symmetrical about the mean value of the sawtooth signal, and then the pulse signal is subdivided into two feedback signals by supplying alternate pulses to each of the detector strands, by multiplexing.

Similarly, the feedback signals are not necessarily pulse signals and could be implemented using any means adapted to the way in which the temperature difference between the detector strands is detected.

What is claimed is:

1. A thermal accelerometer comprising two detector strands having resistivity that is temperature sensitive, a detector member for detecting a temperature difference between the detector strands, a feedback member for establishing temperature equilibrium between the detector strands by supplying the detector strands with pulse feedback signals of variable width, and a member for calculating acceleration, the accelerometer further comprising a multiplexer member connected to the detector strands, to the detector member, and to the feedback member so as to perform the following in alternation: measuring the temperature difference between the detector strands; and providing the detector strands with the feedback signals, the widths of the pulse signals being determined by comparing a sawtooth signal, said sawtooth signal having constant upper and lower limits that are independent of temperature, with DC signals representative of the temperature difference between the detector strands.

2. An accelerometer according to claim 1, wherein the DC signals representative of the temperature difference between the detector strands are symmetrical about a mean value of the sawtooth signal.

3. An accelerometer according to claim 1, wherein, for the temperature difference having a value of zero, the pulse feedback signals are of equal widths.

4. The thermal accelerometer according to claim 2, said pulse feedback signals including a first feedback signal and a second feedback signal, each provided to one of said detector strands, said first feedback signal obtained by comparing said sawtooth signal with DC signals $\epsilon+\frac{1}{2}$ and $-\epsilon-\frac{1}{2}$ and the second feedback signal obtained by comparing said sawtooth signal with DC signals $-\epsilon+\frac{1}{2}$ and $\epsilon-\frac{1}{2}$.

* * * * *